(12) United States Patent
Raiser

(10) Patent No.: US 6,616,424 B2
(45) Date of Patent: Sep. 9, 2003

(54) DRIVE SYSTEM AND METHOD FOR THE OPERATION OF A FUEL CELL SYSTEM

(75) Inventor: Stephen Raiser, Egelsbach (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/930,552

(22) Filed: Aug. 15, 2001

(65) Prior Publication Data

US 2002/0064695 A1 May 30, 2002

(30) Foreign Application Priority Data

Aug. 25, 2000 (DE) .......................... 100 41 864
Jun. 21, 2001 (DE) .......................... 101 30 095

(51) Int. Cl.[7] .......................... F04B 17/00; F04B 35/04
(52) U.S. Cl. .......................... 417/411; 429/23
(58) Field of Search .................. 417/32, 411; 180/65.3;
429/23, 38, 17, 22; 290/40 C, 2; 363/84;
244/59; 60/595

(56) References Cited

U.S. PATENT DOCUMENTS

| 3,681,609 | A | * | 8/1972 | Boese et al. ................ 290/2 |
| 4,193,111 | A | * | 3/1980 | Wester ..................... 363/84 |
| 4,815,294 | A | * | 3/1989 | David ...................... 60/595 |
| 5,106,035 | A | * | 4/1992 | Langford, III .............. 244/59 |
| 5,510,201 | A | * | 4/1996 | Werth ...................... 429/17 |
| 5,646,852 | A | | 7/1997 | Lorenz et al. ........... 364/431.051 |
| 5,830,593 | A | * | 11/1998 | Nielson .................... 429/38 |
| 6,053,266 | A | * | 4/2000 | Greenhill et al. .......... 180/65.3 |
| 6,159,626 | A | * | 12/2000 | Keskula et al. ............. 429/22 |
| 6,307,277 | B1 | * | 10/2001 | Tamai et al. ............. 290/40 C |
| 2001/0051291 | A1 | * | 12/2001 | Aoyagi et al. .............. 429/23 |
| 2002/0006848 | A1 | * | 1/2002 | Tabata ..................... 417/32 |

FOREIGN PATENT DOCUMENTS

| DE | 4322765 C1 | 6/1994 |
| DE | 19810468 A1 | 9/1999 |
| DE | 19810467 C1 | 10/1999 |

* cited by examiner

Primary Examiner—Teresa Walberg
Assistant Examiner—Leonid M Fastovsky
(74) Attorney, Agent, or Firm—Cary W. Brooks (57) ABSTRACT

A drive system for a compressor that delivers compressed air to a fuel cell system in a motor vehicle. The drive system includes an electric motor that drives the compressor. During normal operation of the fuel cell system, the motor is fed with electrical energy from the fuel cell system. During start-up of the fuel cell system, the electric motor receives electrical energy from a low voltage battery, where the electric motor can be operated at a voltage that is significantly higher than the output voltage of the low voltage battery. An expander can be connected to the compressor to drive the compressor with energy from cathode exhaust gases. Further, hydrogen recirculation can also be employed.

42 Claims, 5 Drawing Sheets

DRIVE SYSTEM AND METHOD FOR THE OPERATION OF A FUEL CELL SYSTEM

TECHNICAL FIELD

The present invention relates to a drive system for a compressor designed to deliver compressed air for the operation of a fuel cell system in a motor vehicle, wherein the drive system comprises an electric motor which in operation can be fed with electrical energy from the fuel cell system, furthermore the invention relates to an apparatus driven by electrical energy and to a method for the operation of a fuel cell system.

BACKGROUND OF THE INVENTION

Fuel cell systems with such drive systems are intended, amongst other things, as power plants for motor vehicles, with the electrical energy delivered by the fuel cells being applied, after appropriate conditioning, to one or more drive motors which serve for the propulsion of a motor vehicle. A part of the output power of the fuel cell system is however also applied to the electric motor which is required in operation to drive the compressor.

In practice problems are associated with the starting up of the fuel cell system.

One known solution provides for the use of a traction battery with an operating voltage of, for example, 288 V. This traction battery has in principle three different tasks:

On the one hand it is used to drive the main compressor in order for this compressor to feed compressed air into the fuel cell system so that the power is generated which then replaces the traction battery as a power source for the electric motor driving the compressor.

The second task of a traction battery is to dynamically assist the electric motor or motors which propel the vehicle. For example, during heavy acceleration or at elevated speed the performance of the traction battery supplements the electrical output power of the fuel cell system.

The third task resides in the fact that the traction battery can be used to realize regenerative braking for example. That is to say, during the slowing down of the vehicle, the kinetic energy present is partly converted into electrical energy which can then be stored in the traction battery.

Although a traction battery can be useful for these different purposes it represents an expensive and heavy component so that one would like to dispense with the traction battery. If, however, the traction battery is dispensed with, it could no longer be used for the starting up of the fuel cell system.

In order to start up the fuel cell system air is required. However, the air compressor is driven by the fuel cell voltage and the latter is not yet available. In the absence of a traction battery it has already been proposed to supply the fuel cell system with sufficient air by means of a 12 V auxiliary blower, i.e. a so-called start-up blower, so that the power generation starts and the system gradually runs up until the power generation by the fuel cell system is sufficient to keep the system operating.

Irrespective of whether one operates with a traction battery or with an auxiliary blower, many components are required which complicate the system and make it more expensive, for example blowers, valves, piping, 288 V battery etc., and one would prefer to dispense with these.

SUMMARY OF THE INVENTION

The object of the present invention is to make sufficient air available for the fuel cell system to be started up and run up to power without the use of a traction battery or an auxiliary blower.

A further object of the present invention is to provide a general concept for the supply of apparatuses with electrical energy when starting operation of a fuel cell system, the concept being capable of being realized at a favorable price and of operating reliably.

Furthermore, the present invention is concerned with the provision of a new method for the operation of a fuel cell system or for starting up operation of a fuel cell system.

In order to satisfy these objects provision is made, in accordance with a first variant of the invention, for the starting of the fuel cell system, that the electric motor which drives the compressor can be driven with electrical energy from a low voltage battery and that the electric motor can be operated at an operating voltage which is significantly higher than the output voltage of the low voltage battery.

In other words it has been recognized, in accordance with the invention, that, despite the not inconsiderable difference in voltage between the output voltage of the low voltage battery and the operating voltage of the electric motor which drives the compressor, it is nevertheless possible to drive the electric motor (and thus also the compressor), at least at low speeds of rotation, to produce an adequate airflow in order to start up the fuel cell system, i.e. to place it in operation.

In this way it is possible to straightforwardly dispense with an expensive and heavy traction battery. A low voltage battery is in any case provided in the operation of a motor vehicle with a fuel cell system in order to supply the on-board electrics customary in the motor vehicle. However, this battery can be made smaller than in a motor vehicle with a customary power plant, since the need to supply a high starter motor current does not exist. This low voltage battery can now be used in a cost-favorable manner for the starting up of the fuel cell system.

In this connection it is particularly favorable when the compressor is a variable speed compressor and a restrictor device is provided at the air outlet side of a fuel cell system which has a restriction effect during the running operation of the fuel cell system but exerts no restriction effect, or only a comparatively small restrictor effect, for the starting up of the system.

It has namely been recognized, in accordance with the invention, that with a variable speed compressor a relatively high air throughput can be achieved when the back-pressure at the output side is kept small. Accordingly an adequate air-flow can be achieved even with relatively little power in order to set the fuel cell system operating.

In accordance with a preferred embodiment of the invention a switching device is arranged between the terminals carrying the operating voltage, i.e. the output terminals of the fuel cell system and the output terminals of the low voltage battery and selectively connects either the operating voltage or the low voltage to the electric motor or to a feed module connected in front of the electric motor.

The switching device should preferably be so designed that it produces a galvanic separation between the terminals carrying the operating voltage and the output terminals of a low voltage battery. In this manner it is possible to prevent the low voltage battery being loaded with the substantially higher operating voltage. Also a clear association is provided in this way between the respective power source and the electric motor. The switching device can for example be formed as a contacter, whereby the switching device can reliably perform many switching processes during the working life of the motor vehicle. Moreover the contactor represents a favorably priced solution for the use in accordance with the invention of a low voltage battery for the starting up of a fuel cell system.

A further embodiment of the invention lies in the provision of a voltage converter, which brings the output voltage of the low voltage battery to a voltage level which corresponds at least substantially to the operating voltage of the electric motor. For this purpose the voltage converter can for example be a lower power DC-DC converter which is sufficient to transform up the potential of the low voltage battery, of for example 12 V, to about 288 V. The required output power lies at around 200 W (in comparison the maximum output power of electric motor is about 7 kW), so that the corresponding current of the low voltage battery is under 20 Amps, from which it can be seen that both the DC-DC converter and also the low voltage battery can be designed in a cost-favorable manner for the purpose of realizing the invention.

It is particularly favorable when the electric motor is an AC motor with a feed module in the form of an inverter being connected in front of it, when the voltage converter is a DC-DC converter and when both the output of the DC-DC converter and also the operating voltage delivered from the fuel cells can be fed to the input of the inverter.

On the one hand the AC motor represents a favorably priced motor for the driving of the compressor and can be readily controlled from a power inverter (a so-called PIM power inverter module). On the other hand this solution offers the possibility of permanently connecting the output of the DC-DC converter to the terminals which carry the operating voltage, so that no special measures are required in order to switch the DC-DC converter on and off, since it only operates when the electrical system is switched on and the operating voltage is lower than the output voltage of the DC-DC converter. Thus no particularly expensive technical circuit measures are required in order to realize this embodiment.

It is however not essential to realize the electric motor as an AC motor; the use of a DC motor with appropriate control or with an appropriate feed module could also be considered.

Typical values for the output voltage of the fuel cell system, i.e. the operating voltage lie in the voltage range between 100 V and 500 V, whereas the output voltage of the low voltage battery that is used normally lies in the range between 12 V and 48 V and preferably amounts to either 12 V or 42 V.

As already mentioned the motor vehicle is preferably conceived to utilize the drive system of the invention in such a way that no traction battery is present. The compressor is, for example, a so-called screw compressor, since a compressor of this kind represents a main compressor which can be utilized for operation in the backpressure-free, low load case.

Other types of compressor can also be used which have a corresponding behavior.

In accordance with a further variant of the invention an apparatus driven by electrical energy is provided for the operation of a fuel cell system and can be fed in operation with electrical energy from the fuel cell system, the apparatus being characterized in that it can be driven by electrical energy from a low voltage battery for the starting of the fuel cell system, and in that it can be operated at an operating voltage which is significantly higher than the output voltage of the low voltage battery.

It has thus been recognized, in accordance with the invention, that the concept of driving apparatuses which are normally operated at high voltage using energy from a low voltage battery during the starting up of the fuel cell system can be extended to other apparatuses. For example, the concept can be extended to the driving of a hydrogen recirculation pump. The concept is, however, also capable of being used for the operation of other electrically operated components. Such other components are, for example, a heating apparatus in order to preheat a valve endangered by frost, or a heating apparatus which is used for generating water vapor.

In accordance with a third variant of the invention a method of operating a fuel cell system using at least one apparatus which is fed in operation with electrical energy from the fuel cell system is characterized in that the apparatus is driven for the starting of the fuel cell system with electrical energy from a low voltage battery, and in that, after the starting of the fuel cell system and the production of electrical energy by the fuel cell system, the apparatus is subsequently operated with high voltage energy from the fuel cell system.

BRIEF DESCRIPTION OF THE DRAWINGS

The invention will subsequently be explained in more detail with reference to embodiments and to the drawings in which are shown.

DESCRIPTION OF THE PREFERRED EMBODIMENT

Figure 1:
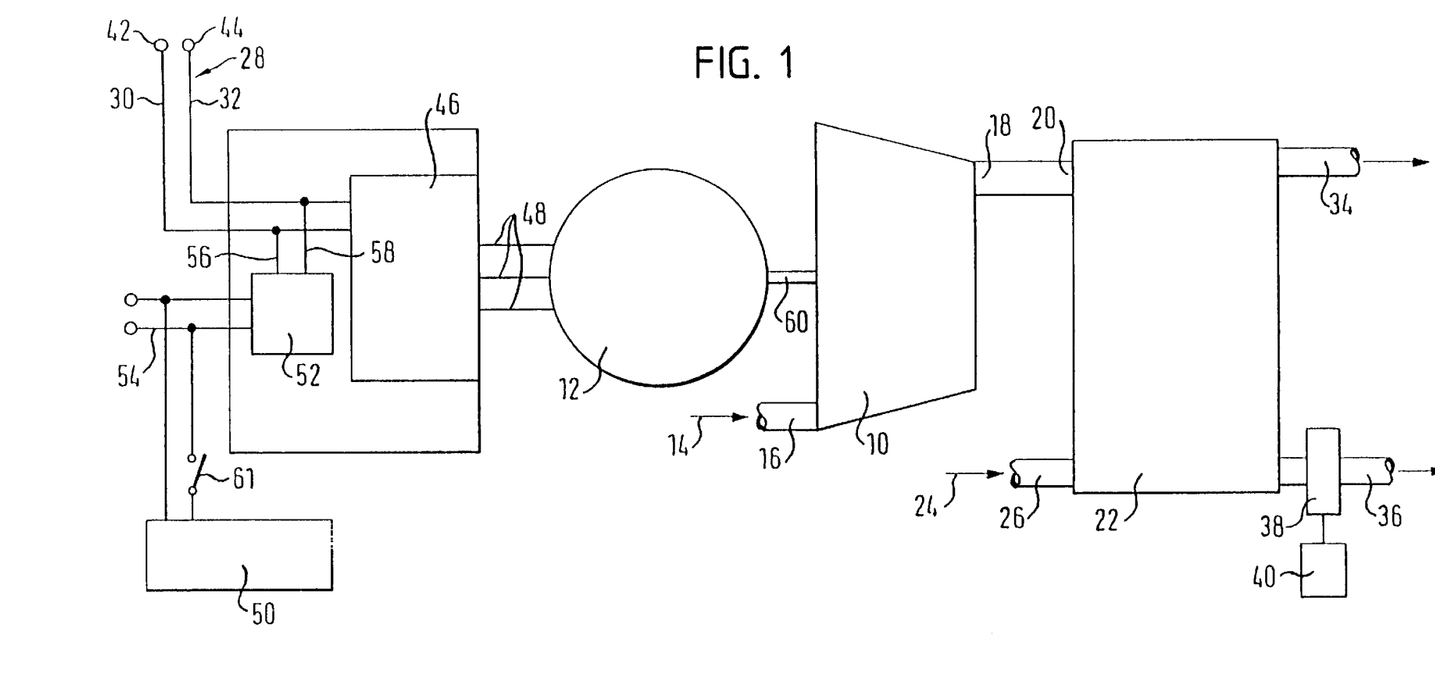
FIG. 1 is a schematic block diagram of a first drive system in accordance with the invention for an air compressor for a fuel cell system.

Referring now to FIG. 1 10 represents a compressor which can be driven by an electric motor 12, for example in form of an AC motor. During the driving of the compressor 10 by the motor 12 air is sucked in by the compressor in accordance with the arrow 14 through the air inlet 16 and is supplied at an elevated pressure via the air outlet 18 of the compressor to the air inlet 20 at the cathode side of a fuel cell system 22.

In this example the fuel cell system is formed by a plurality of PEM fuel cells (Proton Exchange Membrane fuel cells) connected in parallel and/or in series with one another, i.e. these cells are present in the form of a so-called "stack". Hydrogen is supplied in accordance with the arrow 24 to the fuel cell system 22 via the input 26 at the anode side of the fuel cell system and the protons passing through the membranes combine in the fuel cells with the atmospheric oxygen supplied to the cathode inlet 20 in order to form water with the simultaneous generation of electrical energy. The electrical energy passes, in manner known per se, via non-illustrated electrical lines to a high voltage bus 28 consisting of two lines 30 and 32.

At the anode side of the fuel cell systems 22 there is an outlet 34 for the gases present there in the form of excess hydrogen, which can for example be reused or burnt. At the cathode side there is an outlet 36 which leads out excess oxygen, nitrogen and water from the fuel cell system 22, with it being possible to separate off the water and use it to humidify the air leaving the compressor 18 and supplied to the fuel system 20 (not shown). The remaining components, i.e. excess oxygen, nitrogen and non-recovered water leave the system as exhaust gases.

Although the fuel cell system present here uses hydrogen as a fuel there are other fuel cell types which operate with hydrocarbons as a fuel. It is, however, necessary for these hydrocarbons to first be processed by reformation and various shift reactions into a hydrogen-rich synthetic gas for the actual fuel cells.

In addition to the fuel cells, some of the devices which carry out the reformation and shift reactions must be supplied with air for which a compressor is likewise required.

Fuel cells are also known which are directly fed with methanol. Such fuel cell systems also require oxygen for the power generation reaction and have to be supplied with air from a compressor.

The term "fuel cell system" is used here as a generic term, i.e. the fuel cell system 22 could have any form suitable for the operation of motor vehicles. In any event a compressor will be used to supply compressed air.

The reference numeral 38 signifies a restrictor device which can be operated by a solenoid 40 and can indeed be switched between a fully open position for the starting up of the fuel cell system and a restrictor position which is selected during the continuous operation of a fuel cell system after it has been started. Under some circumstances this device is not necessary since with a small air throughput the fuel cells in any event only offer a small air resistance which first increases when the air throughput becomes larger. As an alternative to a restrictor device the exhaust gases could be directed via a controllable branch directly into the environment on start-up of the fuel cells, i.e. without a significant resistance and the branch first reset after achieving the operating state, in order to return the exhaust gases to the normal exhaust gas system for water recovery where a larger resistance prevails.

In continuous operation the fuel cell system 22 produces electrical energy, so that an operating voltage is present at the terminals 42 and 44 of the lines 32 and 30 of the high voltage bus 28. This voltage is supplied via the lines 30, 32 to an inverter in form of the so-called PIM (Power Inverter Module) 46 which drives the electric motor 12 via the lines 48. This type of drive, which contains a control is known per se and will not be discussed here in further detail.

The reference numeral 50 represents a low voltage battery which supplies the inverter 46 via a DC-DC converter 52 with electrical energy for the driving of the electric motor 12 during the starting up of the fuel cell system 22. The low voltage battery 50 is namely connected to the low voltage bus 54 for the on-board electrics of the corresponding motor vehicle and delivers the corresponding electrical power to the DC-DC converter 52 via this low voltage bus 54, after the closing of the switch 61. The output of the DC-DC converter 52 supplies an upwardly transformed voltage via the lines 56 and 58 to the lines 30 and 32 of the high voltage bus 28 which, as already explained, leads directly to the inverter 46.

When starting up operation of the fuel cell system electrical power is thus applied, after the closing of the switch 61, from the low voltage battery 50 to the DC-DC converter 52 and the restrictor device 38 is opened via the solenoid 40. After the transforming up of the voltage applied to the voltage converter 52 this upwardly transformed voltage is applied via the lines 30, 32 to the inverter 46. The latter then serves from the driving of the electric motor 12 and via its output shaft 60 for the driving of the compressor 10 which supplies the fuel cell system with air.

Figure 2:
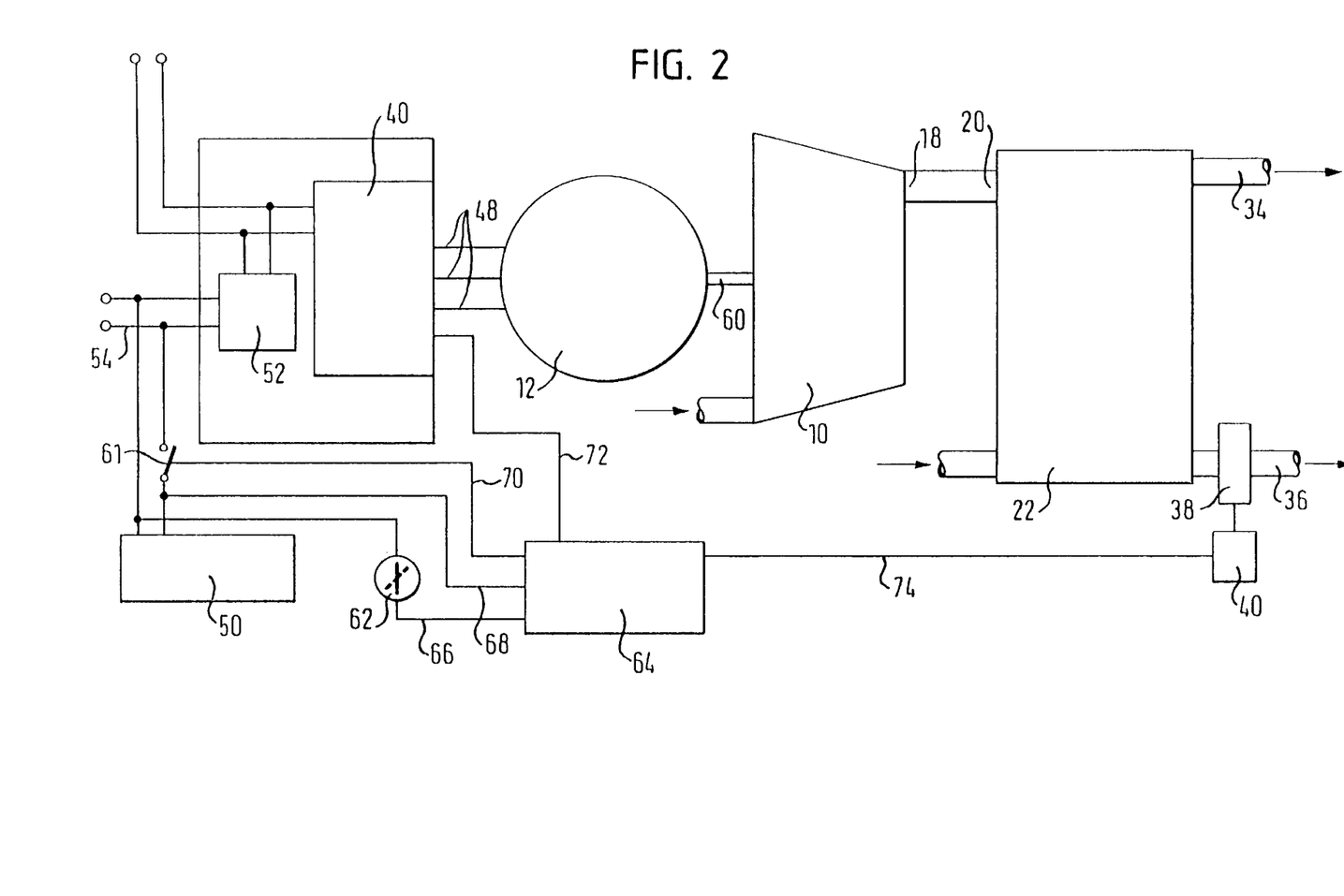
FIG. 2 is a representation similar to FIG. 1, but with further details of a possible electrical circuit.

FIG. 2 shows a possibility for the switching on of the drive system in accordance with FIG. 1, whereby FIG. 2 contains, in addition to the components shown in FIG. 1, a key switch 62, an electrical control 64 and lines 66, 68, 70, 72 and 74.

When the user enters his vehicle he can, for example, operate the key switch 62 to cause the control 64 to close the switch 61 via the line 70 so that the output voltage of the low voltage battery is applied to the DC-DC converter 52 via the low voltage bus.

At the same time the solenoid 40 is caused to open the restrictor device 38, for example in the form of any desired slider, via the control line 74. The control signal passes via the control line 72 to the inverter 46 so that the latter starts operating and drives the electric motor 12 via the lines 48. The electric motor 12 then drives the compressor 10 via the shaft 60. The air supply for the fuel system 22 leads, in a short time, to the generation of the desired operating voltage by the fuel cell system 22 which is then available at the terminals 42 and 44 of the high voltage bus and enables a higher output current of the inverter 46. Through the higher output current the output power of the electric motor 12 increases and thus the speed of the compressor 10. The restrictor device 38 can then be closed. The fuel cell system is now in normal operation.

Since the operating voltage at the output terminals of the DC-DC converter now corresponds to or exceeds the output voltage of the latter, the DC-DC converter no longer generates any current and the supply of the electric motor 12 takes place fully via the high voltage bus of the fuel cell system 22.

Figure 3:
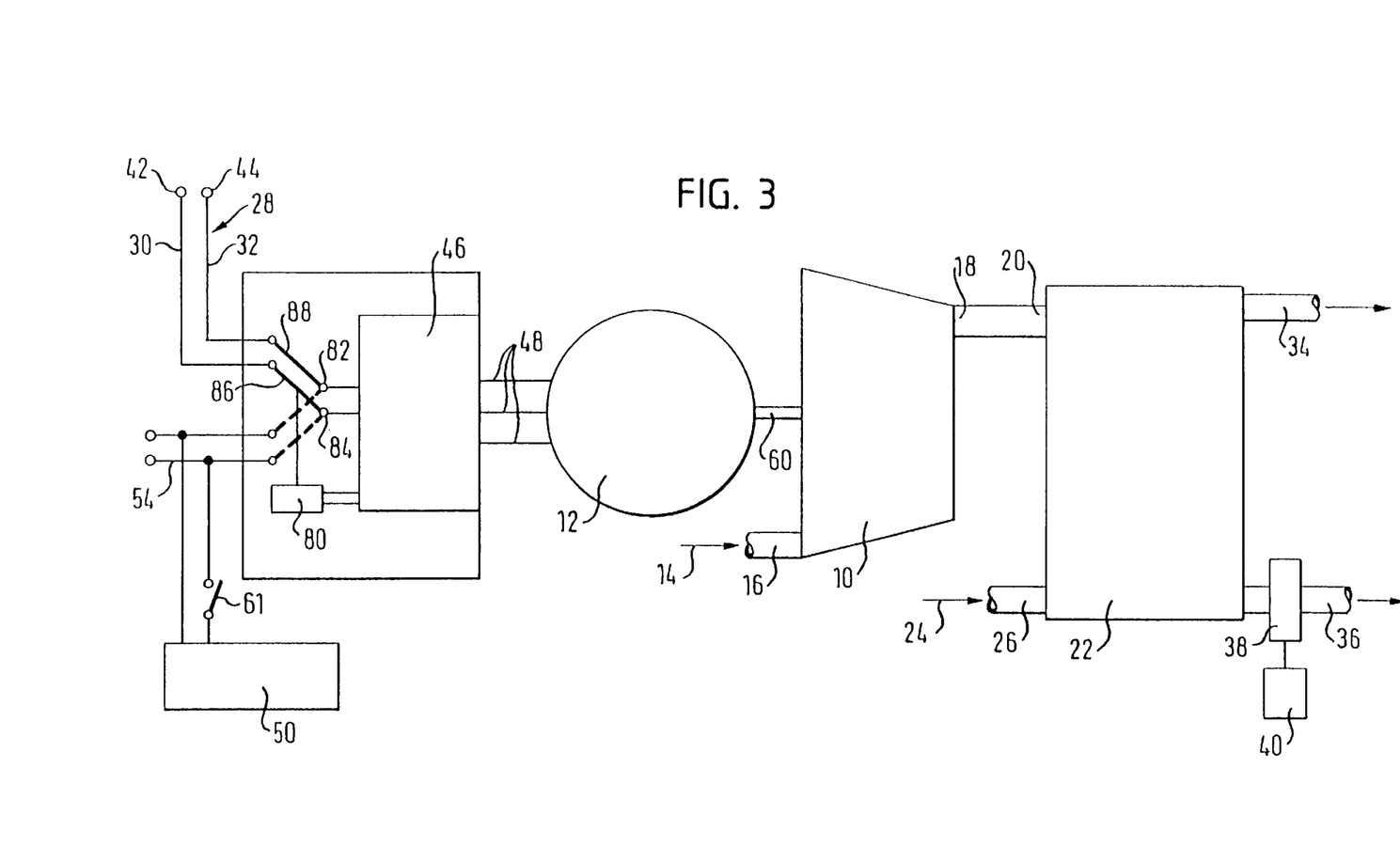
FIG. 3 is a representation similar to FIG. 1 of a further variant of a drive system in accordance with the invention for an air compressor of a fuel cell system.

FIG. 3 shows an alternative way of supplying the electric motor 12 with electrical power from a low voltage battery. The components shown in FIG. 3 correspond extensively to those of the embodiment of FIG. 1, which is why the same reference numerals are used for the same parts. The description given for the embodiment of FIGS. 1 and 2 also applies to the components of the embodiment of FIG. 3 which are provided with the same reference numerals. A switching device 80 in the form of a contactor is used in the embodiment of FIG. 3 instead of a DC-DC converter and selectively connects the input terminals 82 and 84 of the inverter 46 either to the terminals 42 and 44 of the high voltage bus 28 carrying the operating voltage or to the output terminals of the low voltage battery 50.

That is to say the contactor 80 serves for the movement of the movable switching arms 86 and 88. In this way the inverter 46 can either be supplied with the operating voltage from the terminals 42, 44 or with low voltage from the low voltage bus 54. Although the output power of the inverter 46 is restricted when supplying the inverter with low voltage from the low voltage battery 50, it is sufficient, particularly when using a compressor 10 which has been optimized for backpressure-free low load operation, in order to produce an airflow through the fuel cell system 22 so that the latter generates adequate electrical energy in order to produce the desired operating voltage at the terminals 42 and 44 respectively. As soon as this has been achieved the low voltage battery 50 is decoupled from the inverter 46 by the contactor 80 and adequate electrical power is available at the output of the inverter 46 in order to drive the electric motor 12 and thus the compressor 10 at full power.

Figure 4:
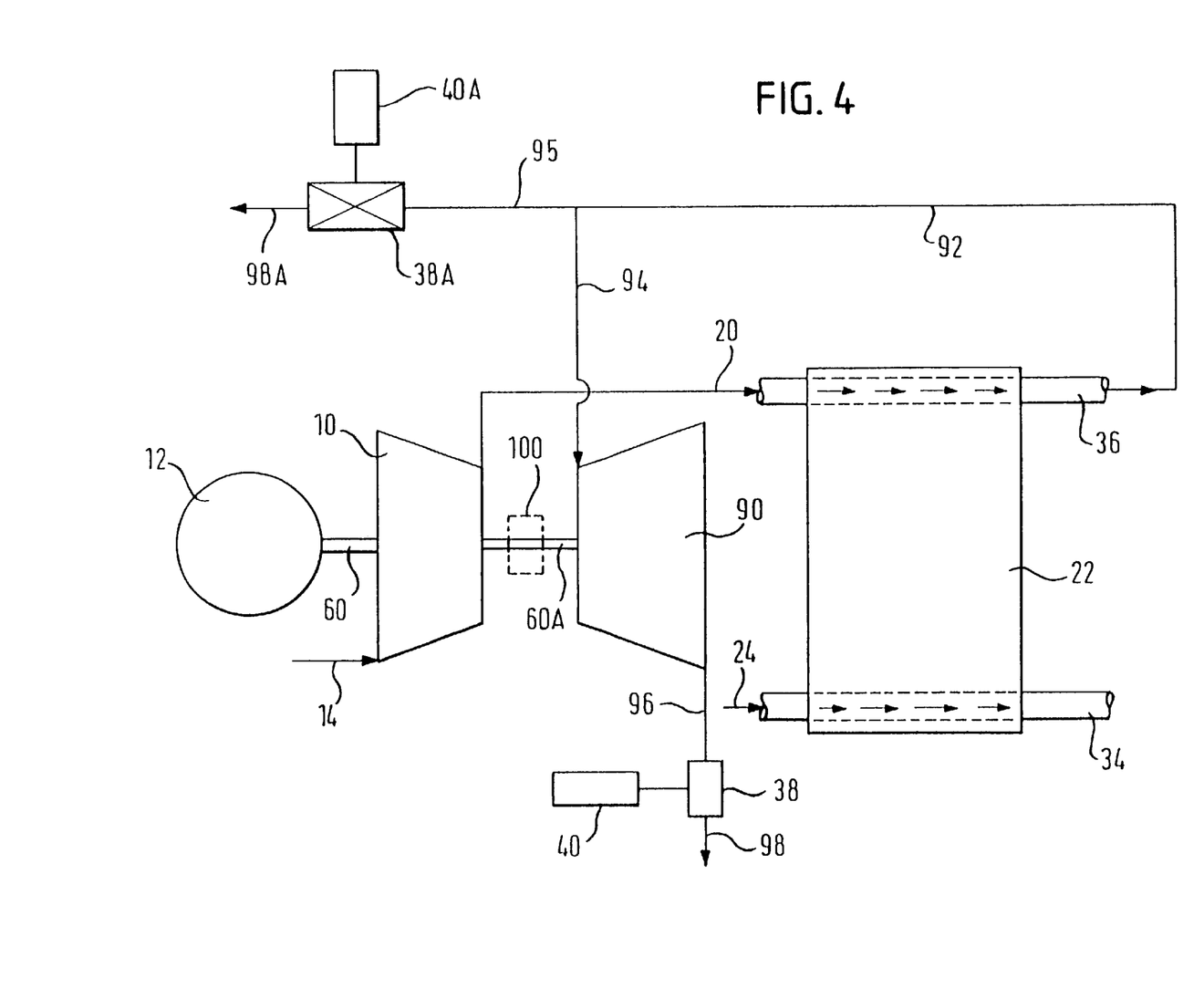
FIG. 4 is a representation similar to the previous representations, but in which an expander is used.

FIG. 4 shows an arrangement which is very similar to that of FIGS. 1 to 3. For this reason common reference numerals have been used for common parts and the previous description given for these parts also applies unless something different is stated.

Important in this embodiment is the fact that an expander 90 is connected via an output drive shaft 60A to the rotor of the compressor 10 or to its drive shaft 60. The cathode exhaust gases which leave the stack at 36 are supplied, in this example via the lines 90 to 94, to the inlet of the expander 90 and the kinetic energy or pressure energy of the cathode exhaust stream which leaves the stack at 36 is converted in the expander into a rotary movement of its output drive shaft 60A which mechanically drives the compressor 10 so that at least a part of the drive energy of the compressor is delivered by the expander instead of by the electric motor 12. This type of drive for the compressor 10 first enters into operation when the fuel cell system has already started up. As already mentioned above, it is at least recommendable, and in many cases necessary, to ensure a low air resistance at the outlet of the fuel cell system for the starting up phase. In the previous embodiment this low air resistance is achieved by the restrictor flap 38 which is opened for the starting up phase under the control of the solenoid 40. The restrictor flap 38 and the solenoid 40 are also used here, but are incorporated into the exhaust gas duct 96 of the expander rather than in the cathode exhaust gas duct, so that the cathode exhaust gases leave the system in accordance with the arrow 98.

Depending on the type of construction and design of the expander it can be necessary to connect an additional flap 38A with solenoid 40A via a line 95 to the line 92 downstream of the branch 94 leading to the expander 90. In the starting up phase this additional flap 38A is then opened, whereby the cathode exhaust gases, which leave the stack at 36 in accordance with the arrow 48, can emerge from the fuel cell system so that they do not first have to overcome any eventually present internal resistance of the expander. It is also conceivable to omit the restrictor flap 38 and solenoid 40 in this embodiment and to use solely the additional flap 38A with solenoid 40A. As the motor 12 has to drive the expander via the shaft 60A in the starting up phase, which represents an additional load on the low voltage battery, a free-wheel device could be used here which is integrated into the expander or is selectively arranged, as illustrated at 100 in broken lines, in the drive shaft 60A between the expander 90 and the compressor 10. Instead of a free-wheel 100 a clutch could also be arranged between the compressor and the expander 90, for example an electromagnetically operated clutch or a centrifugal clutch. It would also be conceivable to insert a transmission, for example a step-down transmission, between these two parts, whereby a higher speed of rotation of the expander in comparison to the compressor is possible.

The implementation of the expander 90 in a version not mechanically coupled to a compressor 10, in the form of an exhaust gas driven turbocharger in a radial compressor design with intercoolers/heat exchangers (a design which is known per se for customary motor cars), is advantageous in connection with a system start-up from the low voltage battery 50. When using an exhaust gas driven turbocharger in the sense of the present teaching, an exhaust gas turbine extracts pressure energy or volume flow energy from the exhaust gas flux of a fuel cell. An additional turbine driven compressor, which is mechanically rigidly coupled to the high rotational speed turbine, relieves the compressor 10 in that an enhanced upstream pressure is made available to the compressor 10 via the additional turbine driven compressor. As an alternative to this the exhaust gas driven turbocharger can be used in such a way that it additionally compresses the air flow delivered by the compressor. In addition to the mechanical decoupling from the compressor 10, the advantage of such an exhaust gas driven turbocharger during starting is the characteristic of the radial compressor, and of flow machines generally, which leads to a situation in which, at a small through-flow (such as is produced when starting the system through the compressor 10), only a minimal counterpressure is built up so that the compressor is not subject to unnecessary loads during starting of the drive system for the compressor.

It should also be noted in connection with FIG. 4 that the lines 36 and 34 have been interchanged relative to the previous embodiments of FIGS. 1 to 3 in order to simplify the drawing. The precise point at which the cathode exhaust gases leave the stack at 36 and the anode exhaust gases leave the stack at 32 is simply a question of the internal design of the stack.

Figure 5:
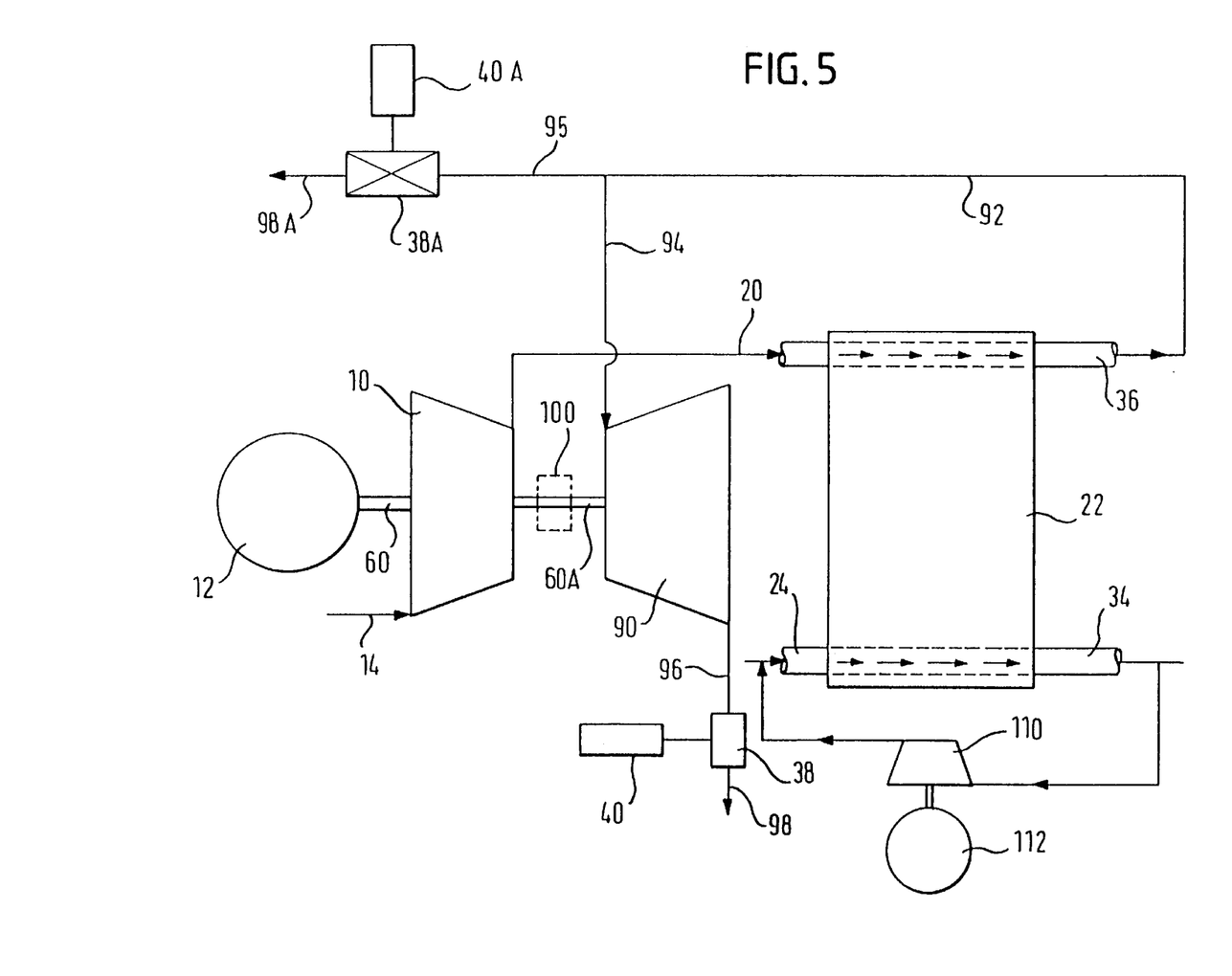
FIG. 5 is a representation similar to the previous representations in which, however, a hydrogen recirculation pump is used.

FIG. 5 now shows a further modification of the inventive embodiment of FIG. 4. Here, a hydrogen recirculation pump 110 with electric drive motor 112 is incorporated into the hydrogen circuit at the anode side of the fuel cell system. The recirculation pump 110 can be a fan or a compressor, for example a radial compressor, an axial flow compressor or a side channel blower. The electric motor 112 is operated here in precisely the same way as the motor 12, i.e., on starting up of the fuel cell system, the motor 112 is energized in parallel to the motor 12 with energy from the low voltage battery 50, whereby the motor 12 for example runs at approximately 10% of the nominal speed of rotation with a power take-up of 50–100 watts. As soon as the fuel cell system produces sufficient electrical energy, the motor 112 and also the compressor motor 12 can be driven via the lines 30 and 32 of the high voltage bus 28, optionally via the inverter 46.

It has namely been found that the hydrogen recirculation which is known per se, for example from the German patent application 10062673.4 or from the international application WO 99/05741, which normally only plays a role in the continuous operation of the fuel cell system, can have a significant influence on the starting up procedure in accordance with the present invention. The small amount of hydrogen recirculation which takes place in the start-up phase namely ensures that the hydrogen is present in a relatively uniformly divided form in the fuel cells and this facilitates the starting up of the fuel cell system with a low air throughput.

It should be pointed out that there are many different possibilities of arranging such a hydrogen recirculation pump in the system. Important, so far as the present invention is concerned, is amongst other things the concept that a recirculation pump of this kind, and optionally also further components, which are as a rule operated at a higher voltage, can be operated during the starting process of the system from a low voltage battery and then, after the start-up phase, subsequently via the high voltage bus and decoupled from the low voltage battery.

What is claimed is:

1. A drive system for a compressor designed to deliver compressed air for the operation of a fuel cell system in a motor vehicle, wherein said drive system comprises an electric motor drivingly connected to said compressor, first terminals to which power generated by said fuel cell system is applied at an operating voltage, said first terminals being connectable to said electric motor for driving said electric motor in operation using said power generated by said fuel cell system, and a low voltage battery for the starting of said fuel cell system, said low voltage battery providing an output voltage substantially lower than said operating voltage and said electric motor being capable of being operated both at said operating voltage and at a voltage derived from said output voltage.

2. A drive system in accordance with claim 1, wherein said compressor is a variable speed compressor, wherein said fuel cell system has an air outlet side and wherein a restrictor device is provided at said air outlet side, said restrictor device exerting a restricting effect on gases leaving said air outlet side of said fuel cell system in driving operation of said fuel cell system, but exerting no or only a comparatively small restriction effect on said gases leaving said air outlet side of said fuel cell system for the starting up of said fuel cell system.

3. A drive system in accordance with claim 1, comprising second terminals to which an output voltage of said low voltage battery is applied and switching device which selectively connects said first terminals or said second terminals to said electric motor.

4. A drive system in accordance with claim 3, wherein said switching device selectively connects said first terminals or said second terminals to a feed module connected to said electric motor.

5. A drive system in accordance with claim 3, wherein said switching device is designed to generate a galvanic separation between said first terminals and said second terminals.

6. A drive system in accordance with claim 5, wherein said switching device is formed as a contactor.

7. A drive system in accordance with clam 1, wherein a voltage converter is provided for bringing an output voltage of said low voltage battery to a derived voltage level which corresponds at least substantially to said operating voltage.

8. A drive system in accordance with claim 7, wherein said electric motor is an AC motor, wherein a feed module in the form of an inverter is connected in front of said electric motor, wherein said voltage converter is a DC-DC converter having said derived voltage output and wherein said derived voltage output and also said operating voltage delivered by said fuel cell system can be fed to said input of said inverter.

9. A drive system in accordance with claim 1, wherein said electric motor is a DC motor.

10. A drive system in accordance with claim 1, wherein said operating voltage of said fuel cell system lies in a voltage range between 100 V and 500 V.

11. A drive system in accordance with claim 1, wherein said output voltage of said low voltage battery lies in a range between 12 V and 48 V.

12. A drive system in accordance with claim 1, wherein said output voltage of said low voltage battery amounts to 12 V.

13. A drive system in accordance with claim 11, wherein said output voltage of said low voltage battery amounts to 42 V.

14. A drive system in accordance with claim 1, wherein no traction battery is present.

15. A drive system in accordance with claim 1, wherein said compressor is a screw compressor.

16. An apparatus driven by electrical energy for the operation of a fuel cell system, the fuel cell system generating, in operation, a relatively high output voltage, there being a battery having a relatively low output voltage, first connections for driving said apparatus with electrical energy from said battery for starting up operation of said fuel cell system and second connections for driving said apparatus with electrical energy from said fuel cell system at said relatively high output voltage, said apparatus being capable of operating when supplied with electrical energy at said relatively low voltage and when supplied with electrical energy at said relatively high voltage.

17. An apparatus in accordance with claim 16, wherein said apparatus is a drive motor for a compressor adapted to supply compressed air for the operation of the fuel cell system.

18. An apparatus in accordance with claim 16, wherein said fuel cell system has a anode circuit operated with hydrogen and a hydrogen recirculation pump contained in said anode circuit and said apparatus is a drive motor for said hydrogen recirculation pump.

19. An apparatus in accordance with claim 17 said compressor having a shaft, wherein an expander is provided which is coupled to said compressor via said shaft, there being a duct for supplying exhaust gases of said fuel cell system to said expander to drive said expander.

20. An apparatus in accordance with claim 19, said duct being adapted to supply cathode exhaust gases of said fuel cell system to said expander to drive the same.

21. An apparatus in accordance with claim 19, wherein said expander has an outlet side and a controllable restrictor flap is provided at said outlet side of said expander.

22. An apparatus in accordance with claim 20 and further comprising a controllable flap provided in said duct.

23. An apparatus in accordance with claim 19, wherein a free-wheel device is provided between said compressor and said expander.

24. An apparatus in accordance with claim 19, wherein a clutch is provided between said compressor and said expander.

25. An apparatus in accordance with claim 24, wherein said clutch is a controllable clutch.

26. An apparatus in accordance with claim 19, wherein a transmission is provided between said expander and said compressor.

27. An apparatus in accordance with claim 26, wherein said transmission is a step-down transmission, i.e., said expander runs faster than said compressor.

28. An apparatus in accordance with claim 18, wherein said hydrogen recirculation pump is a compressor selected from the group comprising axial compressors, radial compressors and side channel blowers.

29. An apparatus in accordance with claim 16 and further comprising an expander capable of being driven by exhaust gases of said fuel cell system, there being an additional compressor and said expander being adapted to drive said additional compressor to deliver a compressed air flow to said compressor.

30. An apparatus in accordance with claim 16 and further comprising an expander capable of being driven by exhaust gases of said fuel cell system, there being an additional compressor and said expander being adapted to drive said additional compressor to additionally compress an outlet air flow of said compressor.

31. An apparatus in accordance with claim 29, wherein said expander and said additional compressor are combined in an exhaust gas driven turbocharger.

32. An apparatus in accordance with claim 30, wherein said expander and said additional compressor are combined in an exhaust gas driven turbocharger.

33. An apparatus in accordance with claim 31, wherein an intercooler is provided between said exhaust gas driven turbocharger and said compressor.

34. An apparatus in accordance with claim 32, wherein an intercooler is provided between said exhaust gas driven turbocharger and said compressor.

35. A method of operating a fuel cell system comprising at least one apparatus which is fed in operation with electrical energy from the fuel cell system, the method comprising the steps of driving said apparatus for the starting of the fuel cell system with electrical energy from a low voltage battery, and after the starting of the fuel cell system and the production of high voltage electrical energy by the fuel cell system, subsequently driving said apparatus with high voltage electrical energy form the fuel cell system, wherein the electrical energy from the low voltage battery is substantially less than the high voltage electrical energy from the fuel system.

36. A method in accordance with claim 35, wherein said apparatus is an electrical motor which serves for the driving of a compressor of the fuel cell system, which is designed to deliver compressed air for the operation of the fuel cell system.

37. A method in accordance with claim 35, wherein, on starting up of the fuel cell system, a hydrogen flow is produced in an anode circuit of said fuel cell system in order to produce a distribution of hydrogen in fuel cells of said fuel cell system.

38. A method in accordance with claim 37, wherein said apparatus comprises a hydrogen recirculation pump for producing a hydrogen circulation the method comprising the steps of operating said pump in the starting phase with electrical energy from a low voltage battery and operating it in the operating state of the fuel cell system with electrical energy from said fuel cell system.

39. A method in accordance with claim 35, wherein at least one of kinetic energy and pressure energy of cathode exhaust gases of said fuel cell system is used to drive an expander which, during operation of said fuel cell system drives said compressor to deliver compressed air for said fuel cell system.

40. A method in accordance with claim 35, wherein, on starting up of the fuel cell system, a restrictor flap at a cathode exhaust gas side of the fuel cell system is opened in order to produce a low air resistance, and this restrictor flap is brought, after successful starting up of the fuel cell system, into a position which ensures a higher air resistance.

41. A method in accordance with claim 40, wherein said controllable restrictor slap is arranged adjacent to a cathode outlet of said fuel cell stack.

42. A method in accordance with claim 34 or 35, wherein a controllable flap is provided in an exhaust gas duct which is connected to a feedback line which leads from a cathode outlet o the fuel cell stack to an inlet of the expander and wherein said controllable flap is open during the starting of the fuel cell system and is at least partly closed after successful starting of the fuel cell system.

* * * * *